R. E. STEVENSON.
WATER SOFTENER.
APPLICATION FILED MAR. 31, 1910.

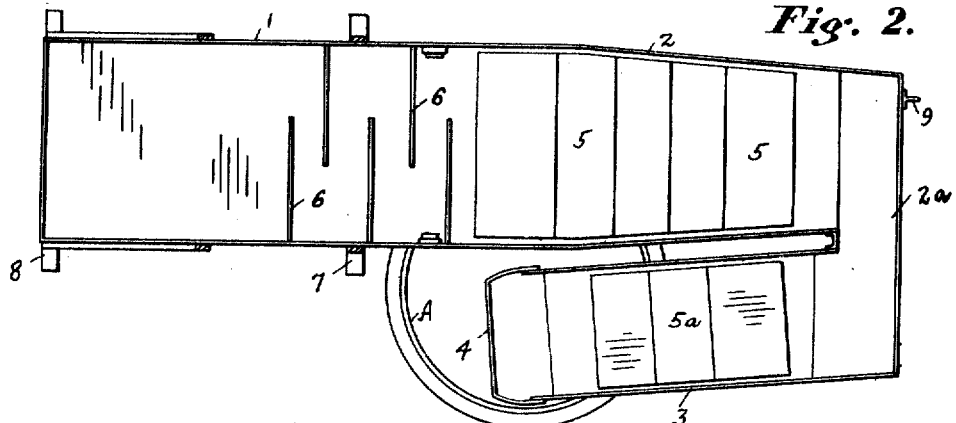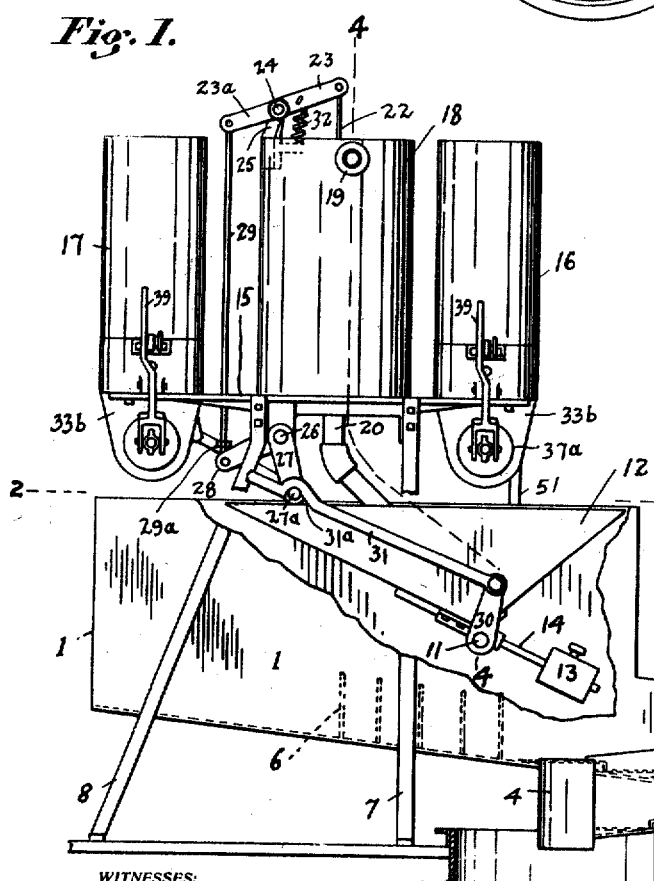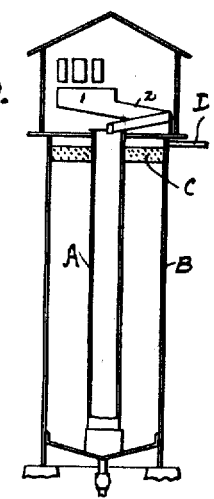

1,011,656.

Patented Dec. 12, 1911
3 SHEETS—SHEET 2.

WITNESSES:
Harold P. Haynes
William Horstman

INVENTOR
ROBERT E. STEVENSON
BY
Thomas L. Ryan
ATTORNEY

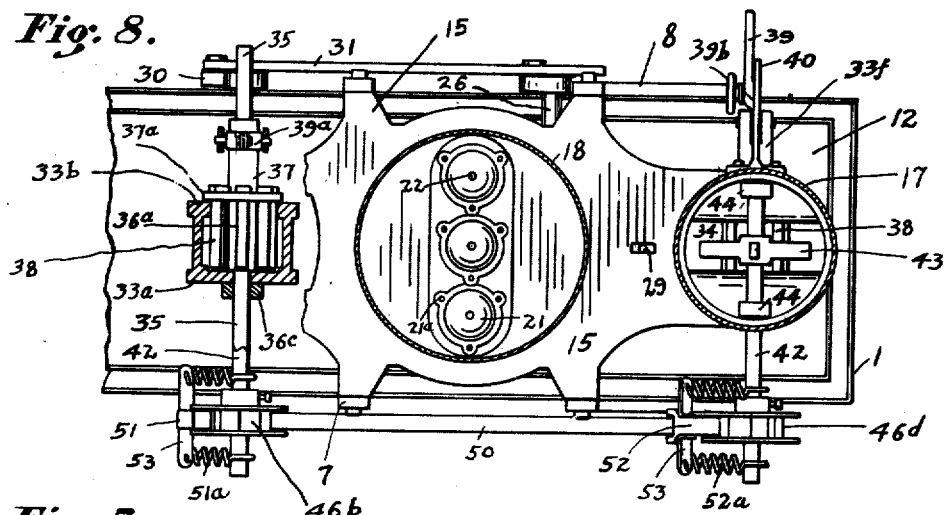

UNITED STATES PATENT OFFICE.

ROBERT E. STEVENSON, OF MUNCIE, INDIANA, ASSIGNOR TO THE PEERLESS WATER SOFTENER COMPANY, OF INDIANAPOLIS, INDIANA, A CORPORATION OF INDIANA.

WATER-SOFTENER.

1,011,656.  Specification of Letters Patent.  Patented Dec. 12, 1911.

Application filed March 31, 1910. Serial No. 552,603.

*To all whom it may concern:*

Be it known that I, ROBERT E. STEVENSON, a citizen of the United States, and a resident of the city of Muncie, in the county of Delaware and the State of Indiana, have invented a new and Improved Water-Softener, of which invention the following is a specification.

This invention relates to improvements in water softeners, with especial reference to apparatus for the softening of water in large quantities necessary for the supply of laundries, and for steam boiler plants and the like.

A well known general method of and structure and arrangement of parts for the circulation and filtration of the water, after the introduction into same of the softening ingredients or reagents or compound, and the initial agitation of the water, is illustrated in Figure 9; the water being delivered downwardly through the central cylinder or tube A, thence rising in the outer cylinder B and through the filtering material C and being then taken off, in softened and cleansed condition, through the conduit B.

Objects of my invention are to provide a device or apparatus whereby the feeding of the softening compound into the water may be accomplished automatically and the strength of the softening compound, and the quantity thereof, may be easily and correctly regulated.

This invention, broadly stated, consists essentially of a receptacle for the reception of the raw water, arranged adjacent to a sluice into which it may empty its contents, and containers for retaining the separate ingredients or reagents constituting the softening compound, so arranged adjacent to the receptacle and there being such connections between same and the receptacle, that one container will discharge into the water that is contained in the receptacle, and the other container will discharge into the water immediately upon its being discharged from the receptacle; also in the providing of means to facilitate the flow and agitation of the water.

The invention consists further in the improved construction, combination and arrangement of parts and details of construction described in this specification, defined in the appended claims, and illustrated in the accompanying drawings, in which—

Figure 6:
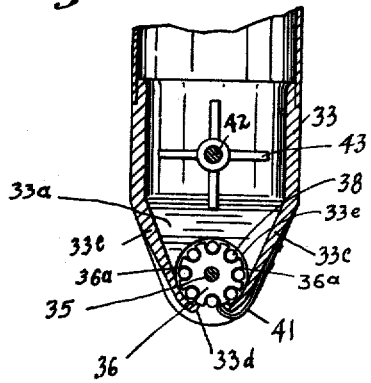
Figure 5:
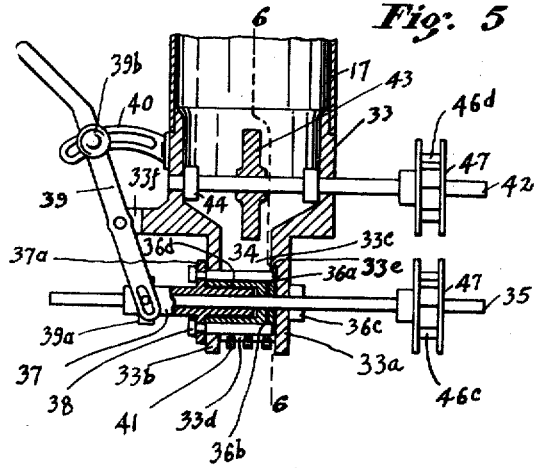
Figure 4:
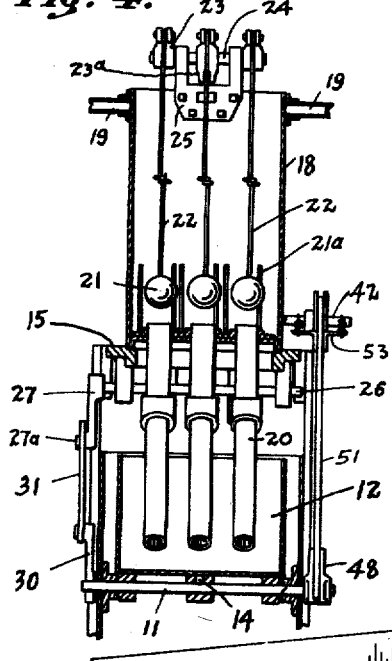
Figure 3:
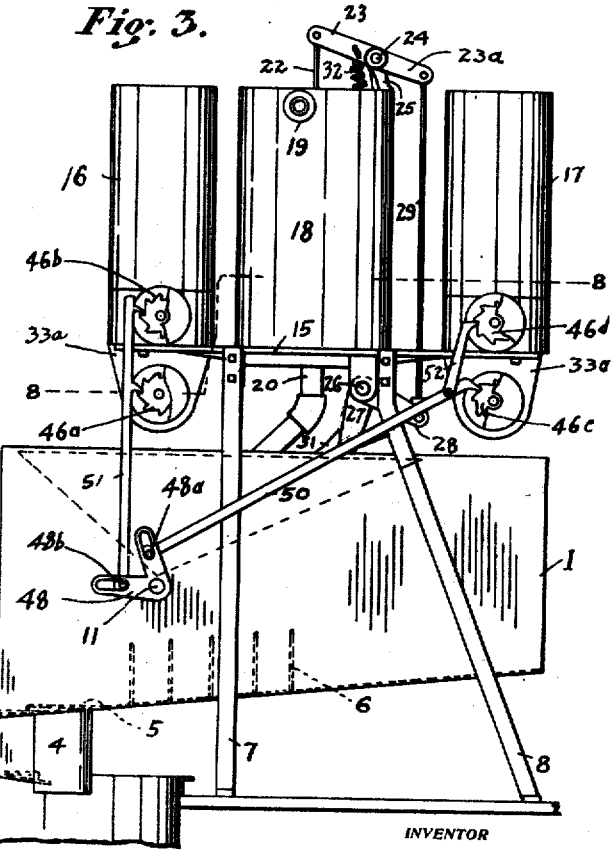

Fig. 1 is a side view of my invention, a portion of the wall of the mixing box being broken away. Fig. 2 is a plan view taken on the line 2—2 in Fig. 1, the operative parts being not shown. Fig. 3 is a reverse side view of my invention portions of the disk plates carried by the ratchet wheels being broken away. Fig. 4 is a transverse sectional view taken on the line 4—4 in Fig. 1. Fig. 5 is an enlarged central vertical transverse sectional view of one of the ingredient containers, the upper portion thereof being broken away. Fig. 6 is a sectional view taken on the line 6—6 in Fig. 5. Fig. 7 is an enlarged view of a portion of Fig. 3. Fig. 8 is an enlarged horizontal transverse sectional view taken on the line 8—8 in Fig. 3. Fig. 9 is a view showing the arrangement of my invention in connection with the filtration means hereinbefore referred to.

The mixing box 1 made preferably of sheet metal, has extended sides and the sloping bottom which will form the upper portion 2 of a sluice. The walls of the upper portion 2 of this sluice, as shown in Fig. 2, are convergent, and from the end 2ª thereof the continued or lower portion 3 of the sluice extends a proper distance and is terminated by an apron or baffle plate 4 against which the water will strike, in its flow from the sluice. On the floor or bottom of the sluice are disposed the steps 5 and 5ª; and on the floor of the mixing box are the upright baffle plates 6 arranged in the staggered order as shown. The structure just described is supported by the legs 7, 8, and 9, and the supports 10, and is so positioned that the end of the sluice will stand immediately above the tube or cylinder A. Mounted on the transverse shaft 11 which is journaled in boxings secured to the walls of the mixing box, is the receptacle 12. This receptacle, designated as a tiltable bucket, is so formed and so balanced by the weight 13 which is adjustably secured to the rod 14, that it will tilt forwardly by the weight of the water accumulated therein and will dump its contents to the bottom of the mixing box. In water softening devices heretofore devised this tiltable bucket feature is used and the softening compound, previously prepared, is fed in various ways, into such a bucket.

A highly satisfactory combination of ingredients or reagents for water softening purposes includes soda ash and lime; however when these reagents are held together in solution for any length of time, deterioration ensues. Efficiency of the solution is depleted and consequently the water that is being treated thereby is not softened uniformly and dependably. In this invention, the lime and the soda ash, as such ingredients, are retained separate and apart in containers provided therefor. The lime is introduced into the bucket, and with the dumping into the mixing box of the contents of the bucket, the soda ash is introduced; these operations being immediately followed by such agitation of the water that the intermingling of the ingredients is effective. Superposed on the table 15 and in the relative positions as shown, is the lime container 16 and the soda ash container 17, means being provided in the bottoms of these containers whereby they may be opened and closed. It is intended that the flow of the raw water into the tiltable bucket shall be so controlled that when the bucket tips forwardly the flow will be stopped, and when the bucket rights itself the flow will be re-opened. To accomplish this result there is disposed on the table 15, the retaining tank 18 into which the raw water is introduced in a steady flow through suitable pipes 19. The outlet pipes 20 lead from the bottom of the tank so as to discharge into the bottom of the bucket. The preferable form of stoppers 21 for the said outlet pipes, is shown in the drawings. These stoppers are composed of spheres made of buoyant material and will be retained against transverse displacement by the uprights 21ª and when dropped into the machined tops of the outlet pipes will effectively close same. The rods 22 upon which the spheres are supported, are jointed intermediate their ends so as to slip upon each other, and at their upper ends they are loosely connected to the arms 23. These arms are carried by the shaft 24 which is journaled in the block 25, and the middle arm 23 has the crank-arm 23ª. Journaled underneath the table is the transverse shaft 26. On the end of this shaft is secured a crank 27, and at the central portion thereof is secured the crank 28. A rod 29 loosely connects the crank 28 and the crank-arm 23ª.

30 designates a crank secured to the transverse shaft 11. To transmit the motion of the crank 30 to the crank 27 is the function of the rod 31.

32 designates a strong coil spring having its one end to engage a stud on the block 25 and the other end to engage the middle arm 23.

The stoppers 21 will be held in the raised position by the rod 31 which engages the wrist pin 27ª of the crank 27. The rear portion of the recess 31ª of the connecting rod 31 is of such slanted or beveled form that as the bucket tips forwardly the connecting rod will be raised at the wrist pin 27ª and the crank 27 will be released. By the quick action of the spring 32 the arms 23 are jerked downwardly and the spheres 21 will instantly drop into closed engagement at the outlet pipes 20. The distance through which the crank shall move by the pull of the spring is regulated by the collar 29ª adjustably secured on the rod 29. When the bucket has tipped completely forward the crank 27 will be reëngaged by the connecting rod 31 and as the bucket rights itself, the spheres will be raised, permitting the water to again flow through the outlet pipes.

A feature of my invention is the means whereby the amount of contents to be fed from the containers 16 and 17 may be predetermined and gaged. The bottom of each of these containers is composed of a bowl 33 having a circular upper edge suitable to retain the cylindrical metal shell which constitutes the body of the container. The interior surfaces of the bowl converge so that the cavity 34 which is formed by the walls 33ª and 33ᵇ and the sides 33ᶜ, terminates in the form of a mouth, the width of which is the distance between the lips 33ᵈ of the sides 33ᶜ. Passed transversely through the said cavity is the shaft 35 which has a bearing in the wall 33ª. The inner face of this wall 33ª is recessed to provide the ledge 33ᵉ. The member 36 which is designated as a fluted sleeve is provided with the continuous parallel longitudinal flutings 36ª and is of such length that with its one end bearing against the inner surface of the wall 33ª as shown in Fig. 5 its other end will register with the outer surface of the wall 33ᵇ. This fluted sleeve is secured to the shaft 35 by suitable means such as the pin 36ᵇ, and outside of the wall 33ª is secured on the shaft, a collar 36ᶜ the function of which is to prevent longitudinal movement of the shaft. Slidingly disposed on the shaft 35 is the cut-off sleeve 37. This cut-off sleeve is of proper diameter to move slidingly within the bore 36ᵈ of the fluted sleeve. The stems 38 project from the flange 37ª of the cut-off sleeve and are of proper diameter to fit slidingly in the semi-circular seats of the flutings 36ª. These stems are of such length that with the cut-off sleeve moved up to position where the flange 37ª will meet the wall 33ᵇ, the stems will occupy the entire length of the flutings. The bore of the wall 33ᵇ will form the bearing for the fluted sleeve.

From the description thus far, it will be seen that with the rotative movement of the fluted sleeve, one fluting after another will be moved to a point between the lips 33$^a$ so that such measure of contents as may have been carried in the fluting will be free to drop therefrom. The ledge 33$^c$ will avoid the lodgment between the fluted sleeve and the wall 33$^a$, of the pulverized ingredient. By the placement of the cut-off sleeve at different locations the length of the area of the flutings thus opened, may be varied. To render easy the adjustment of the cut-off sleeve, the means shown in Fig. 5 have been devised. The hand-lever 39 which is pivotally supported on the lug 33$^f$ has its bifurcated lower end to engage loosely the studs of a ring collar 39$^a$ which is carried loosely in a suitable groove therefor in the cut-off sleeve. The hand-lever will move adjacent to the sector 40 which may be secured to the wall of the container. On the threaded portion of a stud carried by the hand lever and which stud passes through a slot in the sector is the bur 39$^b$ for tightening the hand lever at adjusted positions. By manipulating the hand lever the cut-off sleeve may be so controlled that the measure of contents to be fed from the container, may be precisely had. To avoid possible adhesion of the ingredients to the edges of the flutings, and also to overcome any tendency of the sleeve to reverse movement, there is provided a set of resilient prongs 41 the upturned ends of which will engage the edge of the flutings as they pass the lip 33$^d$. To avoid possible irregularity of movement of the ingredient contents of the bowl, is the function of the stirrer which is capable of being operated in the bowl 33. By this invention the operation of this stirrer is accomplished by the same power that operates the feeding device. Journaled in the walls of the bowl above the shaft 35 is a similar shaft 42 upon which is secured the centrally disposed pronged member 43, the said shaft 42 being held against transverse displacement by the collars 44. Secured to the outer ends of the said shafts 35 and 42, as shown in detail in Figs. 3, 7 and 8, are ratchet wheels, similar to each other, and designated as 46$^a$, 46$^b$, 46$^c$ and 46$^d$. Each of these ratchet wheels will be actuated by a bar having a tooth to engage the ratchet tooth of the wheel. A simple means for avoiding transverse displacement of the toothed bars, are the disk plates 47 which are secured to the sides of the ratchet wheels.

Secured to the shaft 11 is a bell-crank 48; in a slot provided in each of the divided arms of this bell-crank, are retained the wrist pins 48$^a$ and 48$^b$. The toothed bars 50 and 51 have their lower ends connected loosely to the said wrist pins respectively. By reference to Fig. 3 and to Fig. 7 it will be observed that the ratchet wheels 46$^c$ and 46$^d$ are arranged in positions reverse to the other two ratchet wheels. Pivotally secured to the upper portion of the toothed bar 50 is the toothed bar 52. At proper locations on the toothed bars are arranged suitable brackets 53 as shown in Figs. 7 and 8. Pairs of coil springs 51$^a$ and 52$^a$ connected to the ends of the brackets have their ends hooked over the shafts 42 and 35 whereby the toothed bars will be held yieldingly in the positions as shown.

By this combination, construction and arrangement of parts, such actuation of the feeding devices will be had with each operation of the tiltable bucket, that the feed from the container 16 will occur when the bucket reaches the horizontal position, and the feed from the container 17 will occur when the bucket tips forwardly.

Results of my invention are that the reagents used for softening of the water may be maintained separate and apart and the measurement of the quantities of the same may be varied to suit every requirement. Moreover the feeding of same will be regular and dependable; the softening of the water will be accomplished rapidly, uniformly and reliably, and skilled help in operating the apparatus is unnecessary.

The containers 16 and 17 having been filled with an ample supply of lime and soda ash, the flow of the raw water into the tank 19 is opened. The water so introduced through the tank 18 will flow through the pipes 20 and will quickly fill the tiltable bucket. With the tilting of the bucket and the dumping of its contents to the floor of the mixing box the forward movement of the toothed bar 51 operates the cut-off device of the container 17 to discharge a quota of soda ash into the discharged water; the movement forwardly of the bar 51 disengages the wrist pin 27$^a$; the spring 32 being released causes a jerk of the arms 23 and the spheres 21 will drop and close the pipes 20 thereby arresting the flow of water into the bucket; this arrest of the flow through pipes 20 however, is only momentary. The bucket having discharged its contents, it will automatically return to the normal position. In the movement of the bucket to such position the downward movement of the bars 50 operates the cut off device of the container 16 and with the completion of the bucket's movement, a quota of lime will have been deposited in the bucket and the bar 31 having reëngaged the wrist pin 27$^a$ the spheres will have been raised and the pipes 20 thereby opened. The lime is taken into suspension by the water flowing into the bucket which as soon as filled tips forwardly and simultaneously with the dumping of its contents to the floor of the mixing box, a quota of soda ash is ejected from the container 17. The water now so supplied with the necessary softening ingredients proceeds on its flow to the filtration cylinder A. The agitation of the water is continued by its striking the baffle plates 6, and by its flowing over the steps 5 of the upper portion of the sluice with its convergent walls, and thence over the steps of the lower portion of the sluice and against the apron or baffle plate 4.

The entire apparatus is comparatively simple in construction and it is economical of manufacture, installation and maintenance. Access to any and all of the parts is easy and the device is not liable to get out of order or repair. In this specification the invention is shown of the structure and arrangement where heavy duty is required and large capacity is had. Where the raw water is to be directed in a continuously operated flow into the bucket the operation of the rod 31 is dispensed with, the arms 23 being held at raised position.

I am aware that modifications and minor changes may be made in the general structure and in many of the mechanical details of apparatus intended for carrying my invention into effect, such changes not affecting the nature of the invention nor sacrificing any of its advantages.

What I claim as my invention, and desire to secure by Letters Patent, is—

1. In a device of the kind described, a mixing box, a tiltable receptacle arranged to operate by weight of water therein to tilt forwardly and discharge into the said mixing box and then tilt rearwardly to normal position, a container to retain a water-softening ingredient disposed above the tiltable receptacle, a second similar container disposed above the mixing box but aside from the tiltable receptacle, a cut-off device for each container, means having connections between the tiltable receptacle and the cut-off devices whereby the second container will be opened when the tiltable receptacle tips forwardly, and the first container will be opened when the tiltable receptacle is returned to normal position.

2. In a device of the kind described, a mixing box, a tiltable receptacle arranged to operate by weight of water therein to tilt forwardly and discharge into the said mixing box and then tilt rearwardly to normal position, a container to retain a water-softening ingredient disposed above the tiltable receptacle, a second similar container disposed above the mixing box, a cut-off device for each container, means operable by the tiltable receptacle whereby the cut-off devices will be operated to open the second container when the tiltable receptacle tips forwardly, and to open the first container when the tiltable receptacle is returned to normal position, a conduit to convey water into the tiltable receptacle.

3. In a device of the kind described, a mixing box, a tiltable receptacle arranged to operate by weight of water therein to tilt forwardly and discharge into the said mixing box and then tilt rearwardly to normal position, a container to retain a water-softening ingredient disposed so as to discharge into the tiltable receptacle, a second similar container disposed so as to discharge into the mixing box, a cut-off device for each container, means operable by the tiltable receptacle whereby the cut-off devices will be operated to open the second container when the tiltable receptacle tips forwardly, and to open the first container when the tiltable receptacle is returned to normal position, a conduit to discharge water into the tiltable receptacle, hand-operated means for each container to regulate the amount of ingredient discharged therefrom.

4. In a device of the kind described, a mixing box, a tiltable receptacle arranged to operate by weight of water therein to tilt forwardly and discharge into the said mixing box and then tilt rearwardly to normal position, a container to retain a water-softening ingredient disposed so as to discharge into the tiltable receptacle, a second similar container disposed so as to discharge into the mixing box, a cut-off device for each container, means to open the second container when the tiltable receptacle tilts forwardly, and to open the first container when the tiltable receptacle is returned to normal position, a conduit to discharge water into the tiltable receptacle, a cut-off in said conduit, means to operate the cut-off to close the conduit when the tiltable receptacle tips forwardly and to open it when the tiltable receptacle returns to normal position.

5. In a device of the kind described, the combination of a mixing box, a tiltable receptacle arranged to operate by weight of water therein to tilt forwardly and discharge into the mixing box and then return to normal position, a container arranged so as to discharge its contents into the tiltable receptacle, a second similar container disposed so as to discharge into the mixing box, a stirrer for each container, a cut-off device for each container, means operable by the tiltable receptacle whereby the cut-off devices and the stirrers will be operated substantially as described, a conduit to discharge water into the tiltable receptacle, means to regulate the cut-off devices of each of the containers.

6. In a device of the kind described, a mixing box, a tiltable receptacle arranged to operate to tilt forwardly and discharge into the mixing box and then return to normal position, containers to retain water-softening ingredients that are disposed so as to discharge into the mixing box and the tiltable receptacle independently, cut-off devices for each container, means operable by the tiltable receptacle whereby the cut-off devices of the said containers will be operated alternately, substantially as described.

7. In a device of the kind described, a mixing box, a tiltable receptacle arranged to operate by weight of water therein to tilt forwardly and discharge into the mixing box and then tilt rearwardly to normal position, a container to retain a water softening ingredient disposed so as to discharge into the tiltable receptacle, a second similar container disposed so as to discharge into the mixing box, a cut-off device for each container, means to open the second container when the tiltable receptacle tilts forwardly, and to open the first container when the tiltable receptacle is returned to normal position, a water retaining tank, a conduit to discharge into the said tank, an outlet from the tank leading into the tiltable receptacle, a valve for said outlet, means to close the valve when the tiltable receptacle tilts forwardly and to open the said valve when the tiltable receptacle returns to normal position.

8. The combination of a mixing box having a sloping bottom provided with upwardly disposed baffle plates, and having an extended sluice provided with a series of steps on its bottom, a transverse shaft mounted between the walls of the said mixing box, a tiltable receptacle balanced on said transverse shaft to operate by weight of water therein to tilt forwardly and discharge into the mixing box and then to return to normal position, a container disposed above the tiltable receptacle, a second similar container disposed above the mixing box but aside from the tiltable receptacle, a cut-off device for each container, shafts upon which said cut-off devices are supported, a ratchet wheel carried by each of said shafts, a bell crank secured to the aforesaid transverse shaft, connections between the said bell crank and the ratchet wheels whereby the second container will be opened when the container tips forwardly, and the first named container will be opened when the tiltable receptacle is returned to normal position.

9. The combination of a mixing box having its bottom extended in the form of a sluice to discharge into filtration means, a transverse shaft mounted between the walls of the mixing box, a tiltable receptacle balanced upon said transverse shaft to operate by weight of water therein to tilt forwardly and discharge into the mixing box and then to return to normal position, a container disposed above the tiltable receptacle, a second container disposed above the mixing box but aside from the tiltable receptacle, a cut-off device for each container, a raw-water conduit to discharge into the tiltable receptacle, a valve in said raw water conduit, stirrers for each container, shafts upon which said cut-off devices and upon which said stirrers are suported, a ratchet wheel carried by each of the said shafts, a bell crank secured to the aforesaid transverse shaft, toothed bars connected to said bell crank and having engagement with the teeth of said ratchet wheels, connections between the said transverse shaft and the valve in said raw-water conduit whereby the flow of water will be stopped when the tiltable receptacle tilts forwardly, and will be released when the same is returned to normal position.

In testimony whereof I have hereunto signed my name in the presence of two subscribing witnesses.

ROBERT E. STEVENSON.

Witnesses:
 HAROLD P. HAYNES,
 THOMAS L. RYAN.